A. A. C. FAHLSTROM & W. RICHARDS.
COW TAIL HOLDER.
APPLICATION FILED APR. 27, 1909.

945,503.

Patented Jan. 4, 1910.

2 SHEETS—SHEET 1.

Witnesses
Chas. C. Richardson.
John M. Donegan

Inventors
Axel A. C. Fahlstrom &
Warren Richards,

By Chandler & Chandler
Attorneys

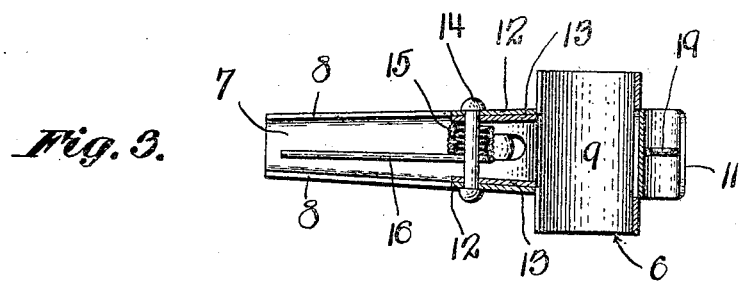
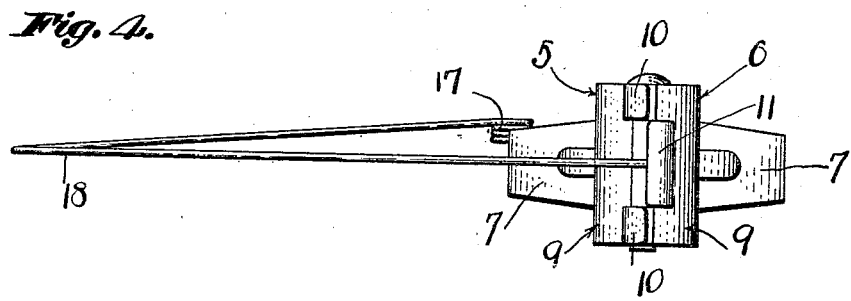
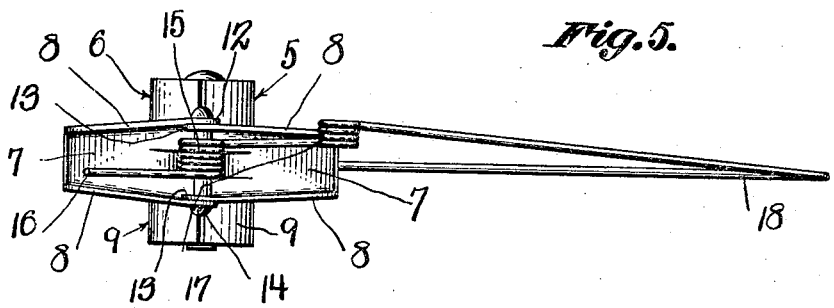

UNITED STATES PATENT OFFICE.

AXEL A. C. FAHLSTROM AND WARREN RICHARDS, OF APPLETON, WISCONSIN.

COW-TAIL HOLDER.

945,503.  Specification of Letters Patent.  Patented Jan. 4, 1910.

Application filed April 27, 1909. Serial No. 492,451.

*To all whom it may concern:*

Be it known that we, AXEL A. C. FAHLSTROM and WARREN RICHARDS, citizens of the United States, residing at Appleton, in the county of Outagamie, State of Wisconsin, have invented certain new and useful Improvements in Cow-Tail Holders; and we do hereby declare the following to be a full, clear, and exact description of the invention, such as will enable others skilled in the art to which it appertains to make and use the same.

This invention relates to improvements in cow tail holders such as are applied to cows during the milking operation.

One object of the invention is the provision of a clamp for the cow's tail which is adapted to hold the tail in such manner that no injury will be inflicted on the animal.

Another object is the provision of a leg clamp which is designed to embrace that portion of the animal's leg above the gambrel joint.

A further object is the provision of a device which may be adjusted to the various sizes of animals.

With these and other objects in view as will more fully hereinafter appear, the present invention consists in certain novel details of construction and arrangement of parts, hereinafter fully described, illustrated in the accompanying drawings and more particularly pointed out in the appended claims. It being understood that various changes in the form, proportion, size and minor details of the device may be made without departing from the spirit or sacrificing any of the advantages of the invention.

Figure 1:
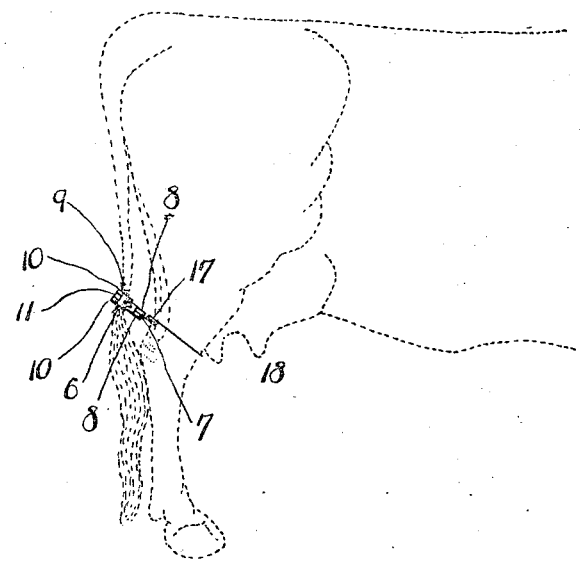
Figure 2:
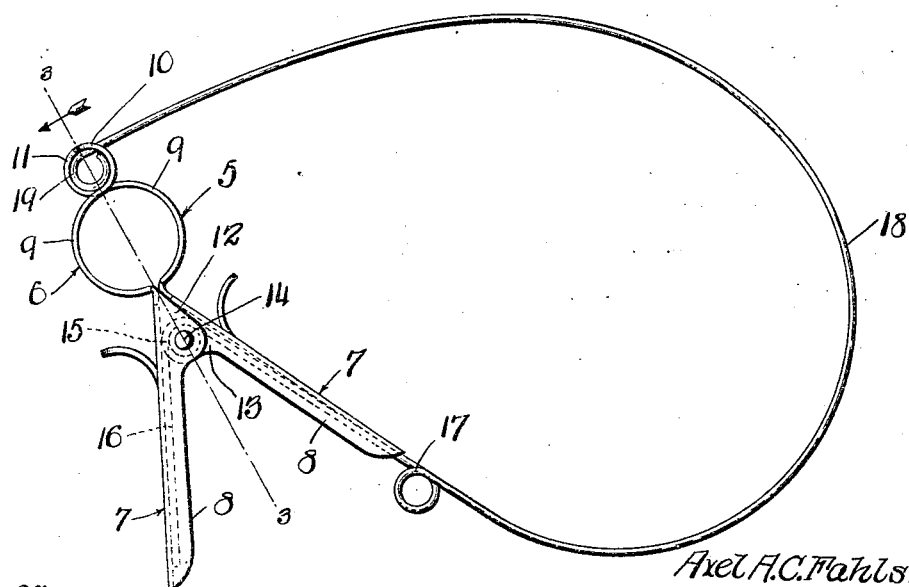

In the accompanying drawings forming part of the specification:—Figure 1 is a side view of a part of a cow showing the invention applied thereto. Fig. 2 is a plan view of the device. Fig. 3 is a section taken on the line 3—3 of Fig. 2. Fig. 4 is a front end elevation of the device. Fig. 5 is a rear end elevation.

Similar numerals of reference are employed to designate corresponding parts throughout.

As shown the tail clamp consists of a pair of pivoted jaws which are designed to clamp between them the tail of the animal. These jaws are designated by the numerals 5 and 6, and are each formed of a single piece of sheet metal which is oblong in contour and for the greater portion of its length is reduced so as to provide a shank 7, the opposite longitudinal sides of which are turned inwardly as shown at 8 so as to present no sharp surfaces. The inner end of each of the shanks 7 terminates in a jaw member 9, the opposite ends of which extend beyond opposite sides of the shank 7. These jaw members 9 are concaved or semi-circular in cross section and at their front sides are provided with interfitting lugs or ears 10 and 11. These ears are curved inwardly and outwardly and when the jaws are in closed position present an annular opening for the reception of a suitable locking pin. The shanks 7 are inclined outwardly and are disposed at an obtuse angle to the outer faces of the jaws, and adjacent their juncture with the latter are provided on their inturned longitudinal sides with lugs 12 and 13 which are perforated to receive a pivot pin 14 by means of which they are pivotally secured, it being understood that the width of one shank is slightly less than that of the other, whereby the lugs on the wider shank will straddle those on the narrow one.

It is to be understood that the curvature of the jaws is such that an opening will be presented which will be sufficient to receive the cow's tail when the jaws are in closed position and will bind thereon sufficiently to prevent slipping or displacement.

In order that the jaws may be yieldingly held in closed position what will subsequently be termed a leg clamp is employed. This member is preferably formed of a single piece of resilient wire, one end portion of which is coiled as shown at 15 so as to provide a helical spring which encircles the pivot pin 14 which connects the jaws. One terminal of the spring is extended outwardly as shown at 16 and is of a length substantially equal to the shanks 7. This terminal 16 is designed to bear on the inner face of one shank while the remainder of the wire at the opposite terminal of the spring 15 is of sufficient length to be extended beyond the opposite shank 7 where it is coiled upon itself so as to provide a small helix 17 and thence extended outwardly and inwardly on a curved line as shown at 18, the free end terminating in an eye 19 which bears on the curved ear of one of the jaws and receives the locking pin before referred to as being insertible through the annular opening presented by the ears when the jaws are in closed position. That portion of the clamp extending from the helix 17 to the eye 19 is of sufficient length to completely straddle that portion of the leg of a cow adjacent the gambrel joint, as clearly shown in the drawings. Thus it will be seen when the device is to be applied to an animal the leg clamp is first adjusted around the animal's leg and the jaws clamped around the bushy end of the animal's tail. In this position it will be seen that it will be impossible for the animal to switch her tail in any direction during the operation of milking. It will be further observed that the leg clamp may be applied to either hind leg of the animal as the operator desires by simply inverting the device. Each of the shanks is provided on its outer face and adjacent the jaw with an upstruck portion 20 which is curved over the face of the shank and constitutes a brace for the fingers of the operator when it is desired to open the jaws.

From the foregoing it can be seen that we have provided a device which is comparatively simple in structure and inexpensive to manufacture embodying few parts and these so arranged that the danger of derangement will be reduced to a minimum. It can be seen that the device can be readily attached to and detached from the tail of the animal in an expeditious manner whenever desired.

Having thus described our invention what is claimed as new, is:—

1. In a cow tail holder, a pair of pivoted jaws having on their forward edges interfitting concaved ears to present an annular opening when said jaws are closed, and a resilient leg clamp having one end connected with one of said jaws and its opposite end provided with an eye to bear on one of said ears and aline with the annular opening presented by all of said ears.

2. In a cow tail holder, a pair of pivoted jaws provided on their front sides with interfitting and outwardly curved ears, shanks extending from the inner ends of said jaws and a curved resilient leg clamp carried by one of said shanks and having its free end provided with an eye to bear on the curved face of one of said ears.

In testimony whereof, we affix our signatures, in presence of two witnesses.

AXEL A. C. FAHLSTROM.
WARREN RICHARDS.

Witnesses:
PETER CHRISTENSEN,
Q. D. MARSTON.